(12) United States Patent
Petersen et al.

(10) Patent No.: US 9,826,754 B2
(45) Date of Patent: Nov. 28, 2017

(54) THROUGH-FLOW FREEZER AND A METHOD FOR STARTING UP THE SAME

(75) Inventors: Erik Jimmy Wolf Petersen, Vejle (DK); Steen Gyldenlov, Lystrup (DK); Ole Bendixen, Galten (DK)

(73) Assignee: Tetra Laval Holdings & Finance S.A., Pully (CH)

( * ) Notice: Subject to any disclaimer, the term of this patent is extended or adjusted under 35 U.S.C. 154(b) by 791 days.

(21) Appl. No.: 14/127,116

(22) PCT Filed: Aug. 9, 2012

(86) PCT No.: PCT/EP2012/065591
§ 371 (c)(1),
(2), (4) Date: Feb. 25, 2014

(87) PCT Pub. No.: WO2013/023986
PCT Pub. Date: Feb. 21, 2013

(65) Prior Publication Data
US 2014/0196476 A1 Jul. 17, 2014

(30) Foreign Application Priority Data

Aug. 12, 2011 (DK) .................................. 2011 70444

(51) Int. Cl.
*A23G 9/22* (2006.01)
*A23G 9/16* (2006.01)
*A23G 9/20* (2006.01)

(52) U.S. Cl.
CPC ............ *A23G 9/225* (2013.01); *A23G 9/163* (2013.01); *A23G 9/166* (2013.01); *A23G 9/20* (2013.01); *A23G 9/228* (2013.01)

(58) Field of Classification Search
CPC . A23G 9/16; A23G 9/20; A23G 9/224; A23G 9/228; A23G 9/166; A23G 9/43
See application file for complete search history.

(56) References Cited

U.S. PATENT DOCUMENTS 2,131,510 A 9/1938 Gray et al.
5,158,506 A * 10/1992 Kusano .................. A23G 9/163
62/136

(Continued)

FOREIGN PATENT DOCUMENTS

DE 3544803 A1 6/1987
EP 0729707 A2 9/1996

(Continued)

OTHER PUBLICATIONS

International Search Report issued by the EPO in corresponding International Application No. PCT/EP2012/065591, dated Dec. 17, 2012 (2 pages).

(Continued)

*Primary Examiner* — Jianying Atkisson
*Assistant Examiner* — Antonio R Febles
(74) *Attorney, Agent, or Firm* — Finnegan, Henderson, Farabow, Garrett & Dunner, LLP

(57) ABSTRACT

A through-flow freezer is disclosed comprising a freezing cylinder, an inlet pipe, an inlet blocking device, an air inlet, an outlet pipe and an outlet blocking device, wherein, at least in one operational mode of the through-flow freezer, the inlet blocking device and the outlet blocking device are closed such that a certain amount of mix and a certain amount of air substantially corresponding to a desired overrun in the freezing cylinder can be entrapped in the freezing cylinder by introducing air via the air inlet. Furthermore, a method for starting up a through-flow freezer is disclosed comprising the step of adding air through the air inlet until a certain amount of mix and a certain amount of air substantially corresponding to a desired overrun is entrapped in the freezing cylinder and a certain cylinder pressure is reached in the freezing cylinder before starting the cooling of the freezing cylinder.

4 Claims, 5 Drawing Sheets

(56) References Cited

U.S. PATENT DOCUMENTS

Figure 1:
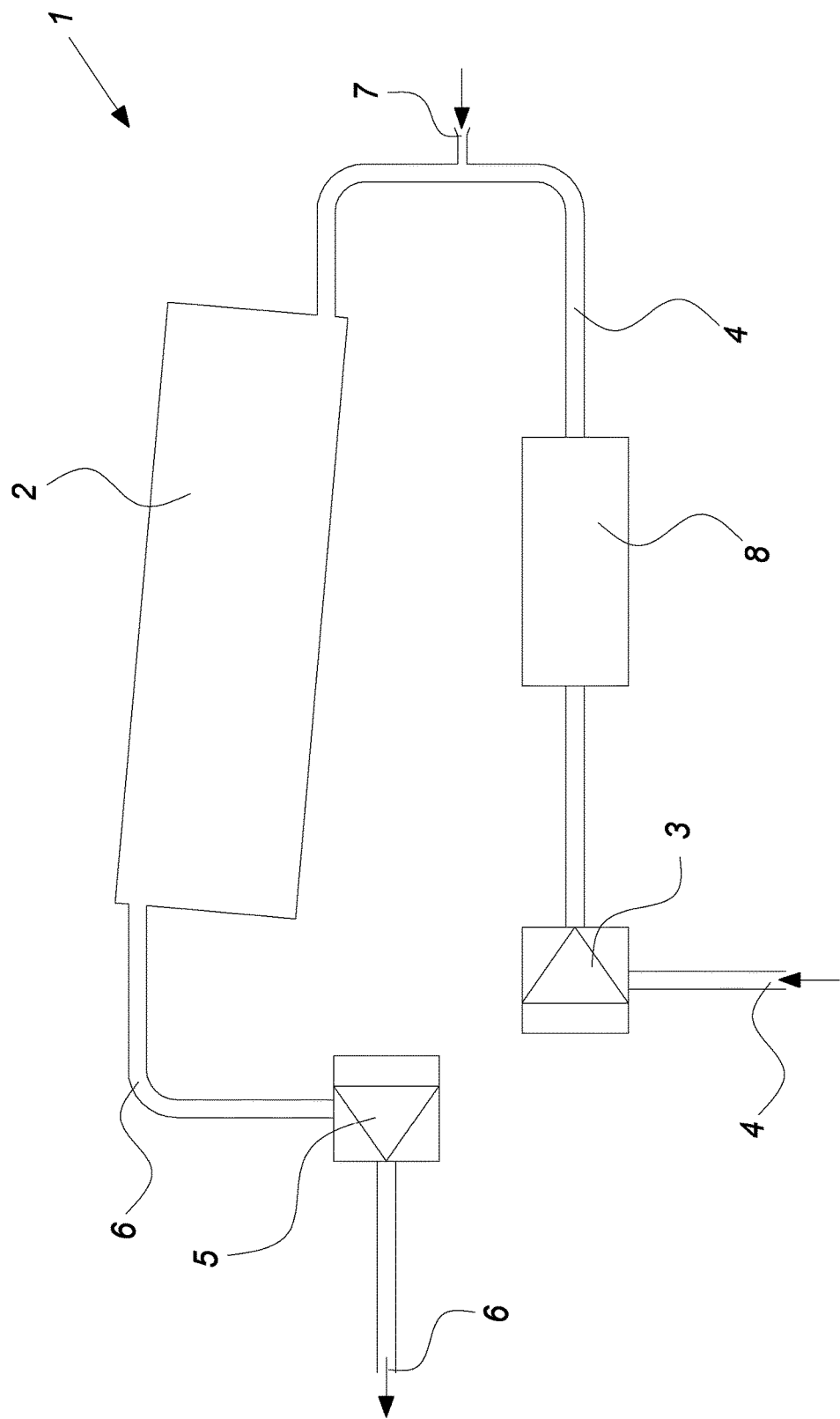

| | | | |
|---|---|---|---|
| 5,201,861 A | 4/1993 | Menzel | |
| 5,615,559 A | 4/1997 | Kress et al. | |
| 6,228,412 B1 | 5/2001 | Groux et al. | |
| 6,637,214 B1 * | 10/2003 | Leitzke | A23G 9/163 62/342 |
| 7,047,758 B2 * | 5/2006 | Ross | A23G 9/12 366/285 |

FOREIGN PATENT DOCUMENTS

| | | |
|---|---|---|
| GB | 852999 A | 11/1960 |
| JP | 62-146565 | 6/1987 |
| JP | 07107917 A * | 4/1995 |
| JP | 2001-060333 | 3/2001 |
| JP | 2005-284914 | 10/2005 |
| JP | 2007-107917 | 4/2007 |
| JP | 2009-508503 | 3/2009 |
| WO | WO 2004/089102 A1 | 10/2004 |
| WO | WO 2007/039066 | 4/2007 |

OTHER PUBLICATIONS

Notice of Reasons for Rejection issued by the Japanese Patent Office dated May 23, 2016, in counterpart Japanese Patent Application No. 2014-524384.

Decision of Rejection issued by the Japanese Patent Office dated Jan. 30, 2017, in counterpart Japanese Patent Application No. 2014-524384.

\* cited by examiner

THROUGH-FLOW FREEZER AND A METHOD FOR STARTING UP THE SAME

CROSS-REFERENCE TO RELATED APPLICATIONS

This is a U.S. National Phase Application of international Application No. PCT/EP2012/065591, filed Aug. 9, 2012, which claims the benefit of priority to Denmark Patent Application No. PA201170444, filed Aug. 12, 2011, which is incorporated herein by reference.

FIELD OF THE INVENTION

The present invention relates to a continuous ice cream freezer, also known as a through-flow freezer, for the production of frozen ice cream, and to a method for starting up such a freezer.

BACKGROUND OF THE INVENTION

In the production of edible ice cream products, it is well-known to use so-called through-flow freezers comprising a freezing cylinder in which a mixture of so-called ice cream mix (also known just as "mix") and air is frozen to ice cream by cooling the freezing cylinder from its outside using a liquid coolant such as, for instance, ammonia ($NH_3$), carbon dioxide ($CO_2$) or some sort of Freon. The ice cream mass is typically transported through the freezing cylinder by pumping.

During start-up of such systems, the freezing cylinder is normally filled at least partly with mix before it is cooled down. After filling the freezing cylinder, the cooling is started and runs for some time, while the mixture of mix and air is whipped or stirred inside the freezing cylinder.

When predefined values of some parameters of this first batch of ice cream inside the freezing cylinder have been reached, the continuous production is started by pumping frozen ice cream out of from one end the freezing cylinder and pumping new mix and air into the other end of the freezing cylinder. This changes the composition of the ice cream mass in the freezing cylinder and, thereby, also the values of different parameters thereof. It takes a certain amount of time, typically several minutes, before the continuous production is stable in the sense that the desired values of such parameters have been reaches. The frozen ice cream produced during this time is typically wasted but may, under certain circumstances, be fed back into the system and reused in the continuous production process.

It is an object of the present invention to provide an improved through-flow freezer and a more effective start-up procedure, which can be used with such a through-flow freezer for reducing the time consumed and the amount of waste ice cream produced until stable conditions for the continuous production have been reached.

BRIEF DESCRIPTION OF THE INVENTION

The present invention relates to a through-flow freezer for the production of frozen ice cream, said through-flow freezer comprising a freezing cylinder for making ice cream by freezing an ice cream mix, an inlet pipe for leading mix into the freezing cylinder, an inlet blocking device arranged to block mix or air from entering or leaving the freezing cylinder via the inlet pipe in a closed state, an air inlet for adding air directly into the freezing cylinder or into the inlet pipe between the freezing cylinder and the inlet blocking device, an outlet pipe for leading ice cream away from the freezing cylinder and an outlet blocking device arranged to block mix, air or ice cream from entering or leaving the freezing cylinder via the outlet pipe in a closed state, wherein, at least in one operational mode of the through-flow freezer, the inlet blocking device and the outlet blocking device are closed such that a certain amount of mix and a certain amount of air substantially corresponding to a desired overrun in the freezing cylinder can be entrapped in the freezing cylinder by introducing air via the air inlet.

Such a configuration of the through-flow freezer enables for the use of a method as described below for starting up the freezer, which reduces the time consumed and the amount of waste ice cream material produced before a stable continuous ice cream production is obtained.

It should be emphasized that by the terms "ice cream mix" and "mix" are to be understood any relevant liquid material that may be frozen to produce frozen edible products, such as ice cream.

In an embodiment of the invention, the pressure in the cylinder is between 1.5 bar and 8 bar, preferably between 2 bar and 6 bar, most preferably between 3 bar and 4 bar.

Cylinder pressures within the suggested ranges correspond to the relevant ranges for the overrun in the final ice cream.

It should be emphasized that by the term "overrun" is to be understood the relative increase in volume of the final ice cream as compared to the volume of the mix used to produce that ice cream. Thus, if for instance 3 liters of final ice cream is produced from 2 liters of mix (the increased volume being due to the air added to the mix before freezing it), the overrun is 50%.

In an embodiment of the invention, the through-flow freezer further comprises a mix flow meter for metering the amount of mix passing through the inlet pipe.

Especially when using pumps driven by asynchronous motors, a metering of the mix flow is important for controlling the operation of the pump motors appropriately.

In an embodiment of the invention, the inlet blocking device comprises an inlet pipe valve for opening or blocking the passage through the inlet pipe.

If the inlet pump is not tight, the necessary blockage of the passage through the inlet pipe can advantageously be obtained by means of an inlet pipe valve.

In an embodiment of the invention, the inlet pipe valve is a three-way valve.

If the inlet pipe valve is a three-way valve, the third port of the valve may for instance be used for draining the freezing cylinder when necessary.

In an embodiment of the invention, the outlet blocking device comprises an outlet pipe valve for opening or blocking the passage through the outlet pipe.

If the outlet pump is not tight, the necessary blockage of the passage through the outlet pipe can advantageously be obtained by means of an outlet pipe valve.

In an embodiment of the invention, the outlet pipe valve is a three-way valve.

If the outlet pipe valve is a three-way valve, the third port of the valve may for instance be used for collecting samples of the ice cream leaving the freezing cylinder.

In an embodiment of the invention, one or both of an inlet pump and an outlet pump of the through-flow freezer is driven by a synchronous motor.

The use of synchronous motors enables for an improved control of the operation of the pumps.

In an aspect of the invention, it relates to a method for starting up a through-flow freezer, the method comprising the steps of:
- ensuring that passages through an inlet pipe and an outlet pipe, respectively, are open,
- starting an inlet pump,
- pumping ice cream mix into a freezing cylinder until it has been filled to a predefined filling level,
- stopping the inlet pump,
- ensuring that the passages through the inlet pipe and the outlet pipe, respectively, are both blocked to be air-tight at least at a desired cylinder pressure of the through-flow freezer corresponding to a desired overrun in a final frozen ice cream,
- adding air through an air inlet until a certain amount of mix and a certain amount of air substantially corresponding to a desired overrun is entrapped in the freezing cylinder,
- starting cooling of the freezing cylinder and rotation of a dasher inside the freezing cylinder,
- waiting until a predefined set point for a viscosity of the contents of the freezing cylinder is reached, and
- opening the passages through the inlet pipe and the outlet pipe and starting continuous production by starting the inlet pump and an outlet pump and adding air in a measured amount corresponding to the desired overrun in the final frozen ice cream.

This method is advantageous in that the fact that there is no leakage through the inlet pipe and/or the outlet pipe through the start-up procedure ensures that the correct amounts of mix and air can be entrapped in the freezing cylinder and the outlet pipe before the pumps are started. This means that the desired overrun in the final ice cream can be obtained right from the beginning of the continuous production, which in turn means that the time consumed and the amount of waste ice cream material produced before a stable continuous ice cream production can be reduced substantially. In practice, a monitoring of the cylinder pressure may be used for ensuring that the correct amount of entrapped mix and air is reached, because the desired amount of entrapped mix and air corresponds to a certain cylinder pressure.

It should be emphasized that by the term "dasher" is to be understood any tool that is suitable for whipping and/or stirring mix inside a freezing cylinder and that holds a number of knives for scraping partly frozen material of the inner surface of the freezing cylinder.

In an embodiment of the invention, the air-tight blockage of the inlet pipe is obtained by closing an inlet pipe valve.

If the inlet pump is not tight, the necessary blockage of the passage through the inlet pipe can advantageously be obtained by means of an inlet pipe valve.

In an embodiment of the invention, the air-tight blockage of the outlet pipe is obtained by closing an outlet pipe valve.

If the outlet pump is not tight, the necessary blockage of the passage through the outlet pipe can advantageously be obtained by means of an outlet pipe valve.

In an embodiment of the invention, the predefined filling level of the freezing cylinder is chosen to be the point at which there is an overflow of mix from the freezing cylinder through the outlet pipe.

This choice of filling level is advantageous in that it is easily seen that the level has been reached, because mix will start flowing out through the outlet pump.

FIGURES

Figure 2:
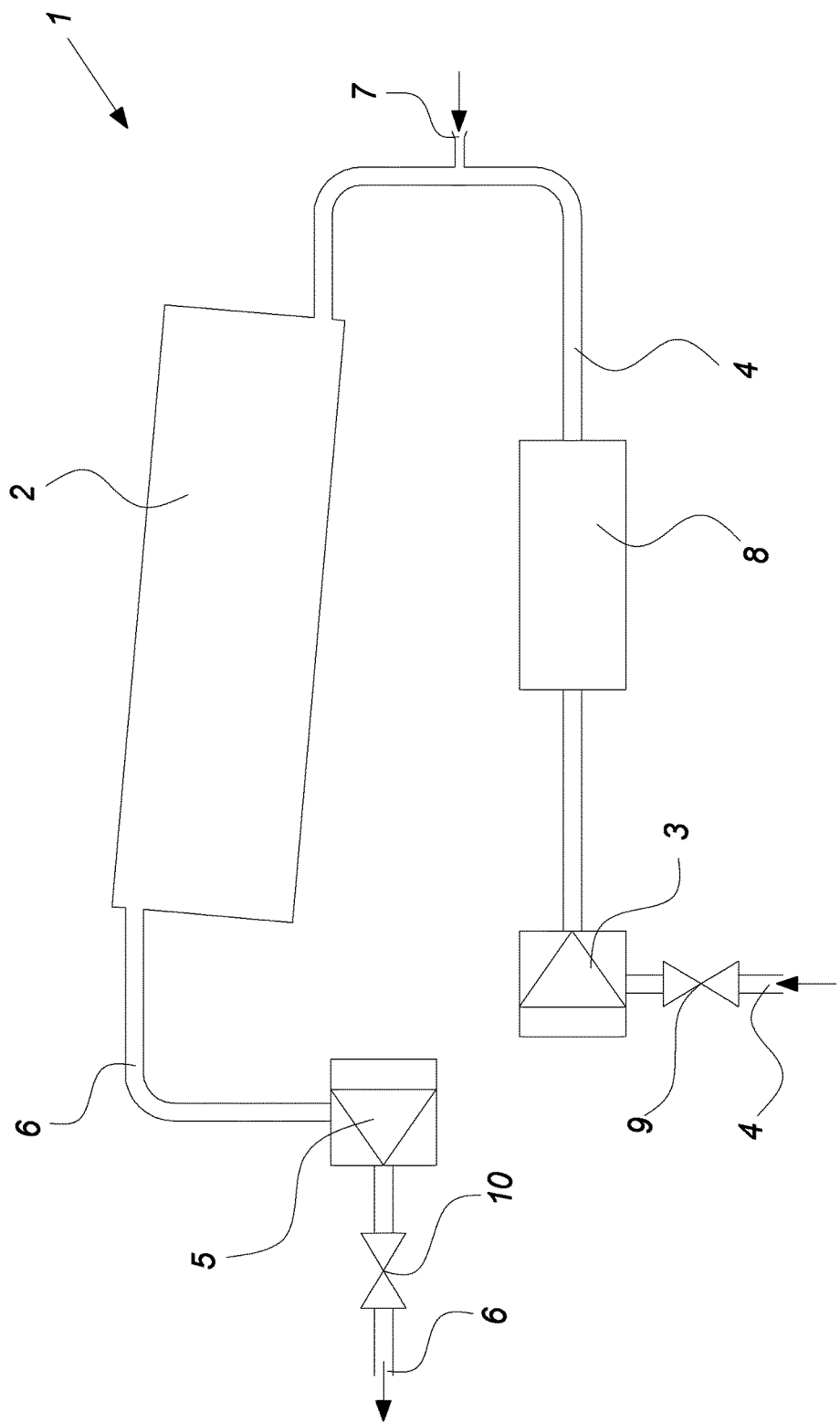
Figure 3:
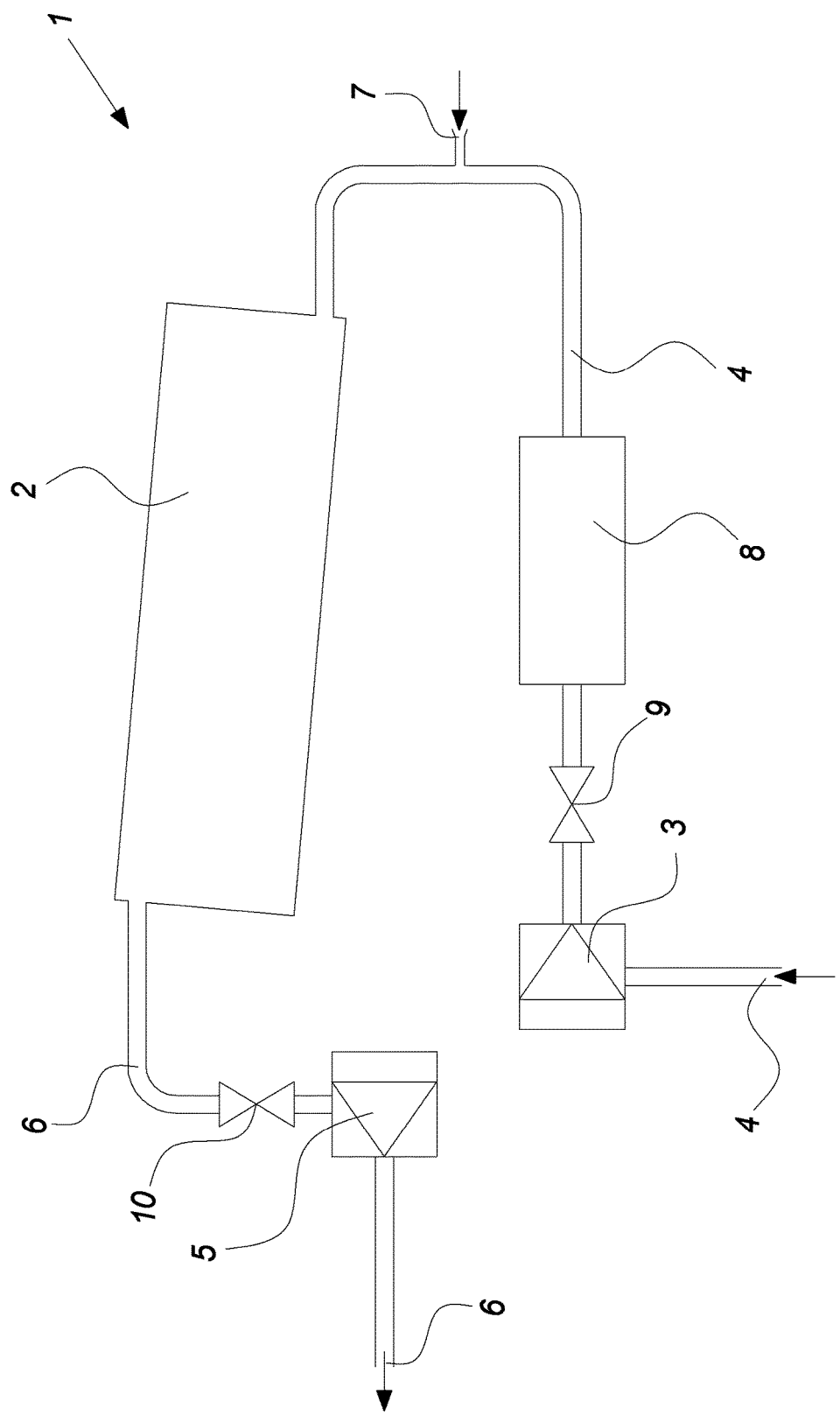
Figure 4:
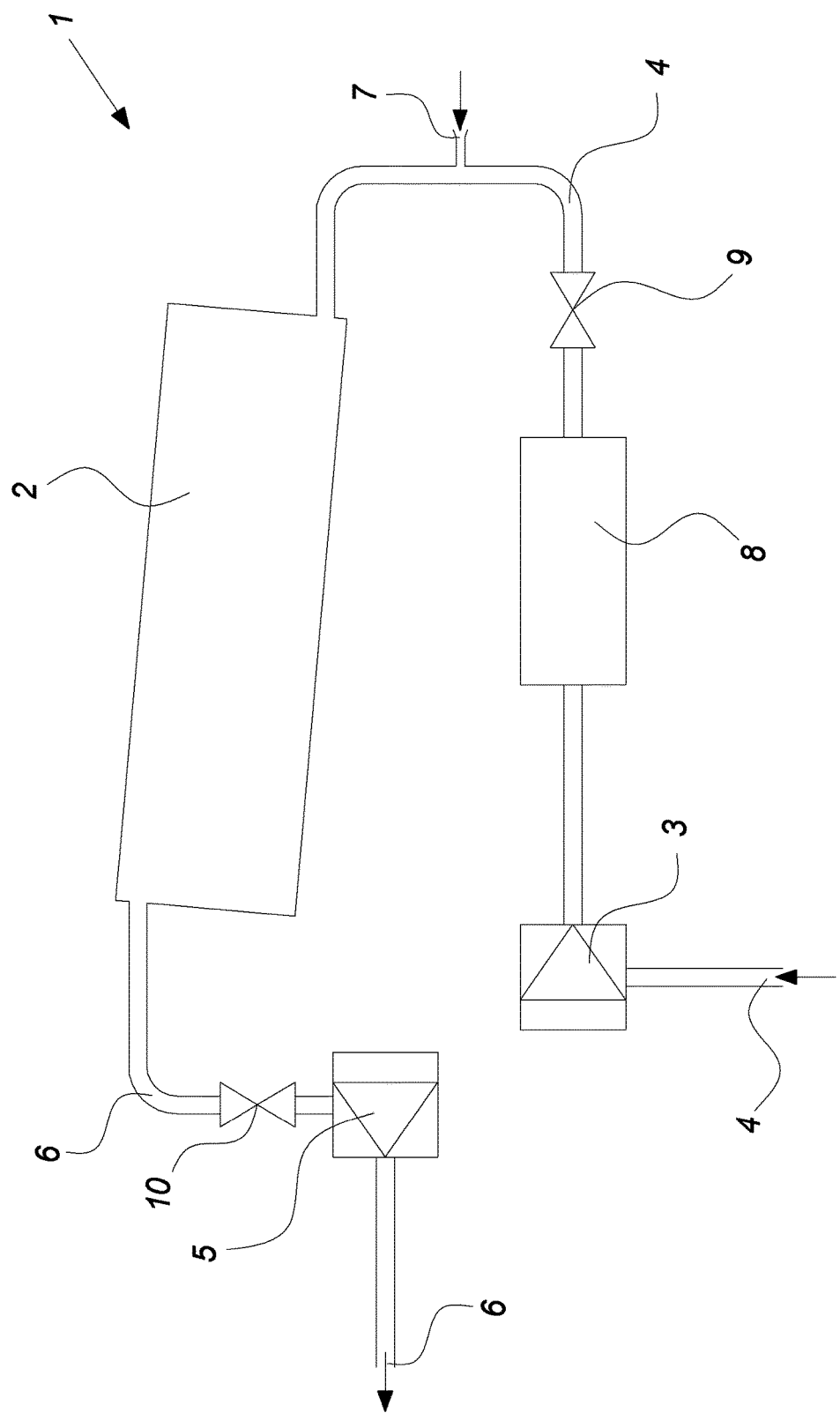
Figure 5:
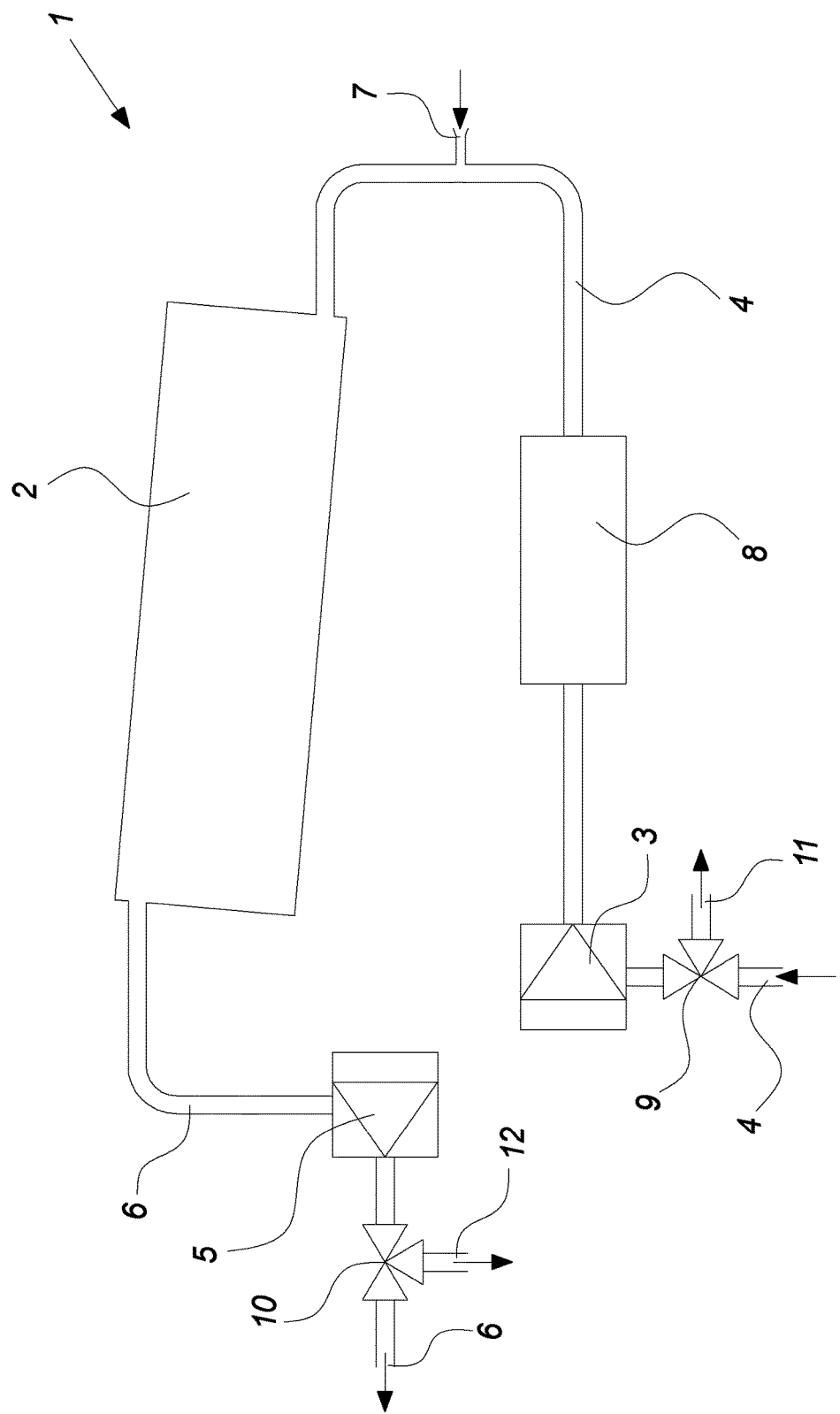

A few exemplary embodiments of the invention will be described in the following with reference to the figures, of which FIG. 1 illustrates schematically some of the essential parts of a through-flow freezer according to a first embodiment of the invention, FIG. 2 illustrates schematically some of the essential parts of a through-flow freezer according to a second embodiment of the invention, FIG. 3 illustrates schematically some of the essential parts of a through-flow freezer according to a third embodiment of the invention, FIG. 4 illustrates schematically some of the essential parts of a through-flow freezer according a fourth embodiment of the invention, and FIG. 5 illustrates schematically some of the essential parts of a through-flow freezer according to a fifth embodiment of the invention.

DETAILED DESCRIPTION OF THE INVENTION

FIG. 1 illustrates schematically some of the essential parts of a through-flow freezer 1 according to an embodiment of the invention.

The main component of the through-flow freezer 1 is the freezing cylinder 2. As mentioned above, the freezing cylinder 2 is cooled from its outside using a liquid coolant such as, for instance, ammonia ($NH_3$), carbon dioxide ($CO_2$) or some sort of Freon. The freezing cylinder 2 may be made from a metal such as nickel, brass, stainless steel or black steel, and the inside surface thereof may be plated for hygienic reasons, for instance with hard chromium.

In the freezing cylinder 2, the mix and the air added thereto is whipped or stirred by a dasher (not shown) and frozen to ice cream, while frozen ice cream is scraped from the inside of the freezing cylinder 2 by means of, for instance, stainless steel blades.

An inlet pump 3 is arranged for pumping mix into the freezing cylinder 2 through an inlet pipe 4 opening into a lower part of the freezing cylinder 2 at one end thereof, and an outlet pump 5 is arranged for pumping frozen ice cream away from the freezing cylinder 2 through an outlet pipe 6, which extends from an upper part of the freezing cylinder 2 at the other end thereof.

In the embodiment of the invention illustrated in FIG. 1, the inlet pump 3 and the outlet pump 5 must both be of a type, which is air-tight at the cylinder pressure of the through-flow freezer 1, which is typically about 4 bar, if the through-flow freezer 1 is to be started up using the procedure described further below. Such types of pumps include, for instance, tube pumps, hose pumps and piston pumps.

As can be seen from the figure, the freezing cylinder 2 is inclined with respect to the horizontal in order to assure that it may be filled almost completely with mix through the inlet pipe 4 before mix starts overflowing through the outlet pipe 6.

An air inlet 7 is arranged so that air can be added to the mix passing through the inlet pipe 4 by means of an air pump (not shown), the amount of added air being metered by an air flow meter (not shown). It should be noted that although in the illustrated embodiment the air inlet 7 opens into the inlet pipe 4, it may open directly into the freezing cylinder 2 in other embodiments of the invention.

Finally, a mix flow meter 8 is arranged to meter the amount of mix passing through the inlet pipe 4. Especially when the inlet pump 3 and/or the outlet pump 5 are driven by asynchronous motors (not shown), a metering of the mix flow is important for controlling the operation of the pump motors appropriately. During continuous operation of the through-flow freezer 1, the inlet pump 3 and the air pump are typically controlled to feed mix and air to the freezing cylinder 2 at constant rates, while the outlet pump 5 is controlled so that the desired cylinder pressure is maintained in the freezing cylinder 2. This cylinder pressure is important for the ability of the air to bind to the mix to which it has been admixed.

Due to the peristaltic or pulsating function of tube pumps, hose pumps and piston pumps, other types of pumps, such as gear pumps, which produce a much more uniform flow, are preferred when choosing the appropriate inlet pump 3 and outlet pump 5 for the through-flow freezer 1. Gear pumps further has the advantage of being adjustable to compensate for normal wear. However, such pumps suffer from the disadvantage that they leak.

The below described start-up procedure requires that the inlet pipe 4 and the outlet pipe 6, respectively, can be blocked to be air-tight at the cylinder pressure of the through-flow freezer 1. Therefore, if this procedure is to be used and the inlet pump 3 is of a leaking type, an inlet pipe valve 9, which is capable of providing the necessary air-tight blockage of the passage through the inlet pipe 4 is needed. Similarly, if the outlet pump 5 is of a leaking type, an outlet pipe valve 10, which is capable of providing the necessary air-tight blockage of the passage through the outlet pipe 6 is needed. Obviously, if different pump types are chosen for the inlet pump 3 and the outlet pump 5, respectively, the resulting embodiments of the invention may require an inlet pipe valve 9 but not an outlet pipe valve 10, and vice versa.

The inlet pipe valve 9 and the outlet pipe valve 10 may be arranged anywhere along the inlet pipe 4 and the outlet pipe 6, respectively. FIGS. 2-5 illustrate different embodiments of the invention all comprising an inlet pipe valve 9 as well as an output pipe valve 10.

FIG. 2 illustrates how the inlet pipe valve 9 may be arranged upstream the inlet pump 3 and the outlet pipe valve 10 may be arranged downstream the outlet pump 5, while FIG. 3 illustrates that it is also possible to arrange the inlet pipe valve 9 downstream the inlet pump 3 and the outlet pipe valve 10 upstream the outlet pump 5. The embodiment illustrated in FIG. 4 is similar to the one illustrated in FIG. 3 with the exception that the inlet pipe valve 9 in FIG. 4 is arranged downstream the mix flow meter 8, whereas it is arranged upstream the mix flow meter 8 in FIG. 3.

The inlet pipe valve 9 and the outlet pipe valve 10 may be integrated parts of the through-flow freezer 1, opened and closed, for instance, by means of electrical actuators and controlled by the overall control system of the through-flow freezer 1.

FIG. 5 illustrates how the inlet pipe valve 9 and/or the outlet pipe valve 10 may also be provided as three-way valves. It should be noted that three-way valves must be chosen, which are able to provide the necessary air-tight blockage of the passage through the inlet pipe 4 and outlet pipe 6, respectively.

If the inlet pipe valve 9 is a three-way valve, the third port of the valve 9 may for instance be used for draining the freezing cylinder 2 through a drain pipe 11 when necessary.

If the outlet pipe valve 10 is a three-way valve, the third port of the valve 10 may for instance be used for collecting samples of the ice cream leaving the freezing cylinder 2 through a sample outlet 12. Also, the use of a three-way valve enables for an easy determination of the time, when mix in the freezing cylinder 2 starts overflowing through the outlet pipe 6 as described above.

A number of parameters are important for a stable continuous production of frozen ice cream. Among these are the viscosity of the final frozen ice cream, the cylinder pressure within the freezing cylinder 2 and the overrun in the final frozen ice cream, which have been defined above.

The viscosity, which is controlled by adjusting the cooling of the freezing cylinder 2, can be determined by measuring the moment necessary for rotating the dasher. Thus, the determined viscosity will be an average value for the ice cream mass within the freezing cylinder 2.

The cylinder pressure, which is important for the ability of the air to bind to the mix as mentioned above, is typically controlled by adjusting the speed of the outlet pump 5. A typical cylinder pressure under normal production conditions is about 4 bar.

As for the overrun, a typical desired value is 100%, meaning that the volume of the final frozen ice cream is twice the volume of the mix used for producing it. Thus in the final frozen ice cream there is an 1-to-1 volume ratio of frozen mix and air at atmospheric pressure, whereas in the freezing cylinder 2 the volume of the air is smaller due to the cylinder pressure, which is substantially higher than atmospheric pressure.

Generally, the production of frozen ice cream is started by making sure that the passages through the inlet pipe 4 and the outlet pipe 6, respectively, are open, starting the inlet pump 3 and filling the freezing cylinder 2 until a predefined filling level has been reached, while pressing air out through the outlet pipe 6. In a preferred embodiment of the invention, this predefined filling level is defined as the point at which there is an overflow of mix from the freezing cylinder 2 through the outlet pipe 6. In through-flow freezers 1 wherein an air-tight outlet pump 5 is used, this means that it will be necessary to let the outlet pump 5 run or to put it in an open mode while filling the freezing cylinder 2.

Then the inlet pump 3 (and the outlet pump 5, if running) is stopped, air is added through the air inlet 7 until a certain pressure has been reached inside the freezing cylinder 2, the dasher inside the freezing cylinder 2 is started and so is the cooling of the freezing cylinder 2 so that the content thereof is frozen into a first batch of ice cream. When a certain set point for the viscosity of the ice cream mass inside the freezing cylinder 2 has been reached, the continuous production is started by starting the inlet pump 3 and the outlet pump 5 and adding air in a measured amount corresponding to the desired overrun in the final frozen ice cream.

In conventional through-flow freezers known in the art, where gear pumps are used and the inlet pipe and the outlet pipe are not provided with valves, there are substantial leakages of mix as well as of air through the pumps during the period before the pumps are started and the continuous production begins. In order to reduce these leakages, it is normal to perform the freezing of the first batch of ice cream at a pressure of about 2 bar rather than at the normal cylinder pressure of about 4 bar, which is used during continuous production.

Thus, although the viscosity of the first batch of ice cream may be similar to the desired viscosity of the final frozen ice cream from the continuous production, the cylinder pressure must be increased substantially (typically doubled) to reach the desired cylinder pressure when the continuous production is started. Furthermore, the overrun in the first batch of ice cream does not only differ from the desired overrun in the final frozen ice cream from the continuous production due to the lower cylinder pressure during start-up. It is also subject to a certain amount of uncertainty due to the leakages.

This means that it will take some time from the start of the pumps until the production parameters are stable and the produced ice cream meets the relevant quality requirements. Especially the overrun takes time to adjust to the desired value. Therefore, a stable continuous production may be defined as obtained when the overrun is within a certain range, such as 2%, from the desired value.

When using a through-flow freezer 1 according to the present invention, however, the leakages during the start-up procedure can be avoided, either by using a non-leaking inlet pump 3 and/or a non-leaking outlet pump 5 or by closing the passages through the inlet pipe 4 and/or the outlet pipe 6 by means of an inlet pipe valve 9 and/or an outlet pipe valve 10, respectively.

This means that the correct mixture of mix and air can be entered into the freezing cylinder 2 from the beginning, and that the first batch of ice cream can be frozen at the correct cylinder pressure of about 4 bar. Thus, when the inlet pipe valve 4 and the outlet pipe valve 6 are opened (if present) and the inlet pump 3 and the outlet pump 5 are started for starting the continuous production, the production parameters are already at the correct levels.

Although the change of the composition of the content of the freezing cylinder 2 when frozen ice cream starts leaving through the outlet pipe 6 and mix and air starts entering through the inlet pipe 4 affects these parameters, a stable continuous production is reached much faster than with conventional through-flow freezers and a conventional start-up procedure. Tests have shown that the time from start of the pumps until stable continuous production is obtained may be reduced by a factor of 4 (from 8 minutes to 2 minutes) for a given through-flow freezer adapted by providing it with an inlet pipe valve 9 and an outlet pipe valve 10 according to the invention.

LIST OF REFERENCE NUMBERS

1. Through-flow freezer
2. Freezing cylinder
3. Inlet pump
4. Inlet pipe
5. Outlet pump
6. Outlet pipe
7. Air inlet
8. Mix flow meter
9. Inlet pipe valve
10. Outlet pipe valve
11. Drain pipe
12. Sample outlet

The invention claimed is:

1. A method for starting up a through-flow freezer, the method comprising the steps of:
   ensuring that passages through an inlet pipe and an outlet pipe, respectively, are open;
   starting an inlet pump;
   pumping an ice cream mix into a freezing cylinder until the freezing cylinder has been filled to a predefined filling level;
   stopping the inlet pump;
   ensuring that the passages through the inlet pipe and the outlet pipe, respectively, are both blocked to be air-tight at least at a desired cylinder pressure of the through-flow freezer corresponding to a desired overrun in a final frozen ice cream;
   while the inlet pump is stopped and the passages through the inlet pipe and the outlet pipe, respectively, are both blocked to be air-tight at least at the desired cylinder pressure, adding air through an air inlet until a certain amount of mix and a certain amount of air substantially corresponding to the desired overrun is entrapped in the freezing cylinder;
   starting cooling of the freezing cylinder and rotation of a dasher inside the freezing cylinder;
   waiting until a predefined set point for a viscosity of the contents of the freezing cylinder is reached; and
   opening the passages through the inlet pipe and the outlet pipe and starting continuous production by starting the inlet pump and an outlet pump and adding air in a measured amount corresponding to the desired overrun in the final frozen ice cream.

2. A method according to claim 1, wherein the air-tight blockage of the inlet pipe is obtained by closing an inlet pipe valve.

3. A method according to claim 1, wherein the air-tight blockage of the outlet pipe is obtained by closing an outlet pipe valve.

4. A method according to claim 1, wherein the predefined filling level of the freezing cylinder is chosen to be the point at which there is an overflow of mix from the freezing cylinder through the outlet pipe.

* * * * *